(12) United States Patent
Bousfield

(10) Patent No.: US 6,210,013 B1
(45) Date of Patent: Apr. 3, 2001

(54) REFRIGERATOR COMPRISING EDGE-LIT PANEL ILLUMINATION SYSTEM

(75) Inventor: Anthony Bousfield, Guisborough (GB)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 09/282,118

(22) Filed: Mar. 31, 1999

Related U.S. Application Data

(63) Continuation of application No. PCT/GB97/02703, filed on Oct. 1, 1997.

(30) Foreign Application Priority Data

Mar. 10, 1996 (GB) .................................................. 9620620

(51) Int. Cl.$^7$ .................................................. F25D 27/00
(52) U.S. Cl. .............................. 362/92; 362/31; 362/218; 362/222
(58) Field of Search .................................. 362/23, 26, 27, 362/29, 31, 217, 218, 220, 222, 232, 224, 92, 327, 326, 558, 559, 580; 40/541, 546, 547; 312/236

(56) References Cited

U.S. PATENT DOCUMENTS

| | | | |
|---|---|---|---|
| 3,612,848 | * | 10/1971 | Koch ...................................... 362/92 |
| 5,287,252 | * | 2/1994 | Caruso ................................... 362/92 |
| 5,390,436 | * | 2/1995 | Ashau ................................ 362/31 X |
| 5,649,754 | * | 7/1997 | Matsumoto ............................. 362/31 |
| 5,836,669 | * | 11/1998 | Hed ..................................... 362/31 X |
| 5,915,855 | * | 6/1999 | Murase et al. ...................... 362/31 X |

\* cited by examiner

*Primary Examiner*—Sandra O'Shea
*Assistant Examiner*—Ismael Negron
(74) *Attorney, Agent, or Firm*—Pillsbury Madison & Sutro LLP

(57) ABSTRACT

A refrigerator capable of being internally illuminated wherein the illumination is provided by an edge-lit panel of a substantially transparent material having two opposed surfaces of which at least one is within the refrigerator and on which a matrix of dots is applied so as to produce a light piping effect internally in to the refrigerator and wherein the light source of the edge-lit panel is located within the enclosed space of the refrigerator. One or more edge-lit panels may be used, which may be shelf of the refrigerator, or its side panels, back panel or roof panel. The edge-lit panel may be form from a transparent acrylic sheet, preferably containing an optical brightner. Protective transparent or translucent layer and a light diffuser may be applied to the surface carrying the matrix of dots. The refrigerators wherein the illumination provided by the edge-lit system according to the present invention have light more evenly distributed throughout the refrigerators and could be effectively illuminated by a light source of reduced wattage, thus reducing problems associated with dissipation of heat within the internal chambers of refrigerators.

9 Claims, 7 Drawing Sheets

REFRIGERATOR COMPRISING EDGE-LIT PANEL ILLUMINATION SYSTEM

This application is a continuation of PCT/GB97/02703 filed Oct. 1, 1997.

FIELD OF THE INVENTION

The present invention relates to an illumination system, in particular such a system for use in a domestic refrigerator.

BACKGROUND OF THE INVENTION

Conventional domestic refrigerators are internally illuminated by a single light source, usually a conventional incandescent light bulb, contained within a transparent or translucent housing and located on one of the internal sides of the refrigerator. The light source is activated by a suitable electro-mechanical switching device on the opening of the door of the refrigerator. Such light sources tend to offer poor illumination due to their location within the refrigerator or the low wattage of the light bulb. Improved illumination by increasing the number of light sources reduces the capacity and increases the cost of the refrigerator. Additionally, such an increase in the number of the light sources within the refrigerator also increases the total heat energy dissipated. This increase in heat dissipation produces an undesirable temperature rise within the refrigerator which has to be compensated for by an increased refrigeration effect. The same occurs when a more intense single light source having a higher wattage is used instead of increasing the number of light sources. Furthermore, the continuous illumination of domestic refrigerators, for example where the refrigerator has a transparent door through which its contents can be viewed, is also not desirable given the amount of heat dissipated from the light sources or more intense light source.

The state of the art in respect of illuminated edge-lit display systems, as used in vertically mounted signs, is typified by EP-A 0549679. EP-A-0549679 addresses the problem of uneven illumination of an edge-lit system by applying a matrix of dots to two opposing surfaces of a transparent sheet which is edge-lit In effect, the dots "pipe" the light from the transparent sheet and the matrix is adjusted such that the density of the dots varies across the sheet to even out the illumination.

SUMMARY OF THE INVENTION

Surprisingly, it has now been found that the internal illumination of a domestic refrigerator can be significantly improved by the use of an edge-lit panel of a transparent or translucent material on which a matrix of dots is located so as to produce a light piping effect. The illumination provided by the edge-lit panel is more evenly distributed throughout the refrigerator. Consequently, the refrigerator can be illuminated by a light source having a reduced wattage as compared to conventional light sources used in refrigerator illumination. A further advantage of the present invention is therefore the ability to provide continuous illumination without significantly increasing the amount of heat dissipated.

Accordingly, in a first aspect of the present invention there is provided a refrigerator capable of being internally illuminated wherein the illumination is provided by an edge-lit panel of a substantially transparent material having two opposed surfaces of which at least one is within the refrigerator and on which a matrix of dots is applied so as to produce a light piping effect internally to the refrigerator.

One or more edge-lit panels may be used.

Although the edge-lit panel may be a side panel of the refrigerator, including the back and roof, it is preferred that the edge-lit panel is present as a shelf on which the matrix of dots has been applied to one or, preferably, both opposed surfaces.

Preferably, the edge-lit panel is formed from acrylic sheet, such as that sold under the tradename Perspex obtainable from Imperial Chemical Industries plc. Such sheet preferably includes an optical brightener, such as that sold under the tradename Ovitex OB obtainable from Ciba Specialty Chemicals (UK) Limited, in order to improve the light transmittance of the sheet.

Typically, the thickness of the edge-lit panel is less than 15 mm and preferably in the range from 6 mm to 8 mm.

Preferably, a protective transparent or translucent layer is applied to the surface of the edge-lit panel that carries the matrix of dots. It is particularly preferred that the transparent or translucent layer is applied directly to the surface that carries the matrix of dots.

Preferably a light diffuser is applied to the surface that carries the matrix of dots. Particularly preferred is where such a light diffuser also acts as a protective layer as hereinbefore described. Typically, the light diffuser is formed from a sheet of suitable material such as that used for the edge-lit panel, e.g. acrylic sheet, and preferably the sheet has a thickness of up to 3 mm.

Preferably, where the edge-lit panel is a side panel of the refrigerator, a reflective layer is applied to the surface which opposes the surface that carries the matrix of dots. Typically, such a layer is formed from a sheet of suitable material such as white or pigmented acrylic sheet and preferably the sheet has a thickness of up to 3 mm.

In a particularly preferred form when the the edge-lit panel is positioned as a side panel, the edge-lit panel is part of a lighting assembly which includes both a light diffuser and also a reflective layer.

In the present invention the matrix of dots serves to provide a conventional light diffusion effect as described in the prior art.

In order to provide a uniform distribution of light from the edge-lit panel it is preferred that the fraction of the surface covered by the dots is increased with increasing distance from the light source. Typically, the fraction of the surface covered by the dots ranges from 0.05 close to the light source and from 0.15 to 0.55, for example 0.16, at the furthest distance from the light source. Although this increase may be achieved by increasing the number of dots per unit area, it is further preferred that the increase is achieved by increasing the diameter of the dots and hence the matrix of dots provides smaller diameter dots close to the light source and larger diameter dots further away from the light source. Typically, the diameter of a dot close to the light source is about 0.3 mm and that of a dot at the furthest distance from the light source is 0.7 mm. Particularly preferred is a matrix of dots in which there is a constant distance between the centres of adjacent dots.

Typically, the dots are white. However, non-white dots may be used to achieve a desired aesthetic effect.

A single light source may be used in the present invention. However, particularly where the distance is large over which the light within the panel is to be transmitted, hereinafter referred to as the transmission distance, two or more light sources may be used. Preferably, where the transmission distance is large, the two or more light sources are positioned at opposing edges of the edge-lit panel. Typically, a single light source may be used where the transmission distance is in the range 450 to 600 mm. Typically, two opposing light sources are used where the transmission distance is in the range 900 to 1200 mm.

BRIEF DESCRIPTION OF THE DRAWINGS

The invention is further illustrated by reference to the following figures.

DETAILED DESCRIPTION OF THE PREFERRED EMBODIMENTS

Figure 1:
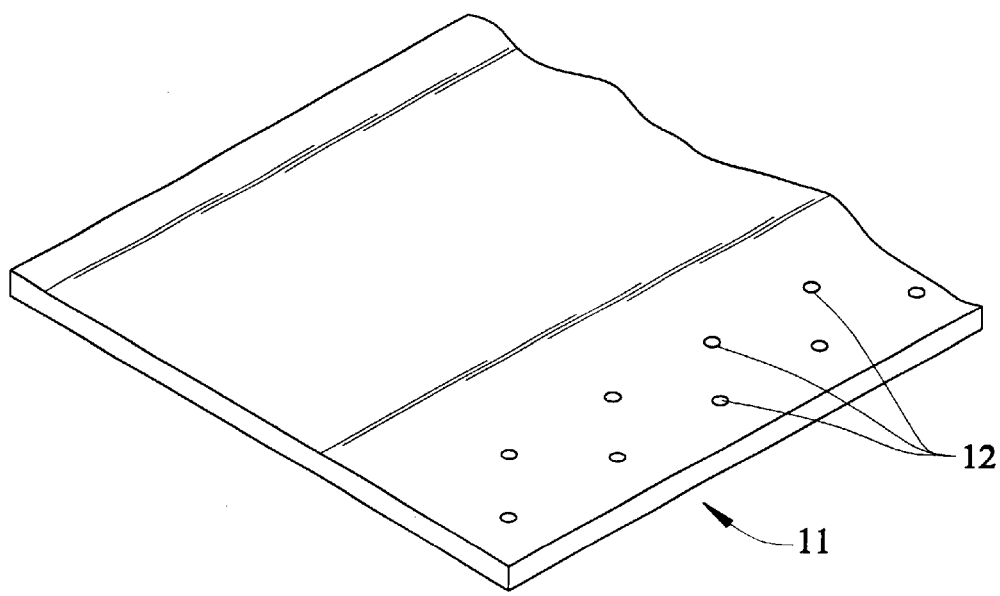
FIG. 1 shows part of the matrix of dots on an edge-lit panel.

In FIG. 1, an edge-fit panel (11) on which has been printed a matrix of dots (12) on one surface.

Figure 2:
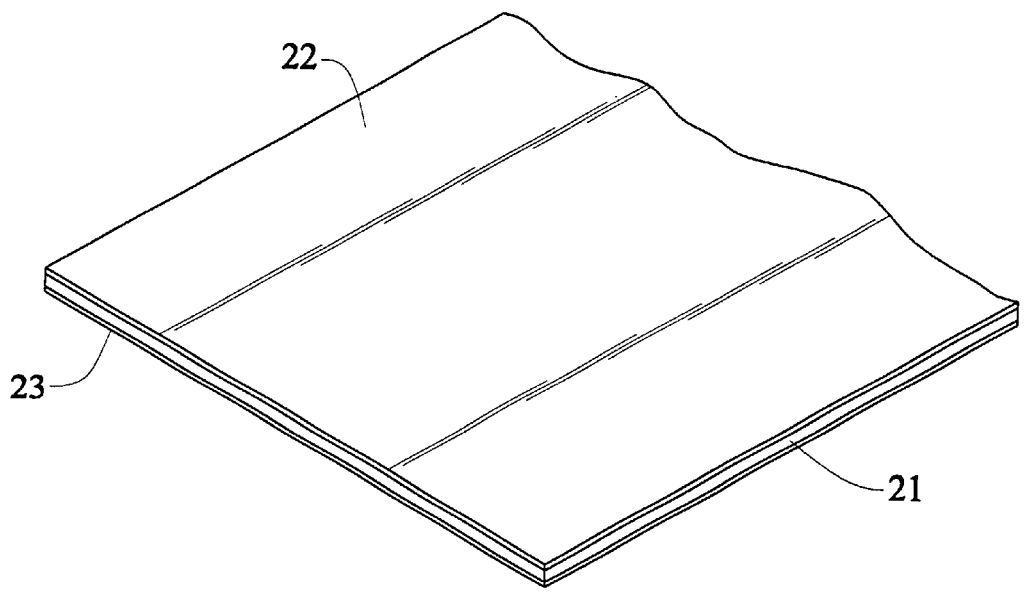
FIG. 2 shows a partially sectioned view through a lighting assembly which includes an edge-lit panel.

In FIG. 2 an edge-lit panel (21) similar to that of FIG. 1 and suitable for use as a side panel is shown in a lighting assembly comprising a light diffuser (22) and a reflective layer (23).

Figure 3:
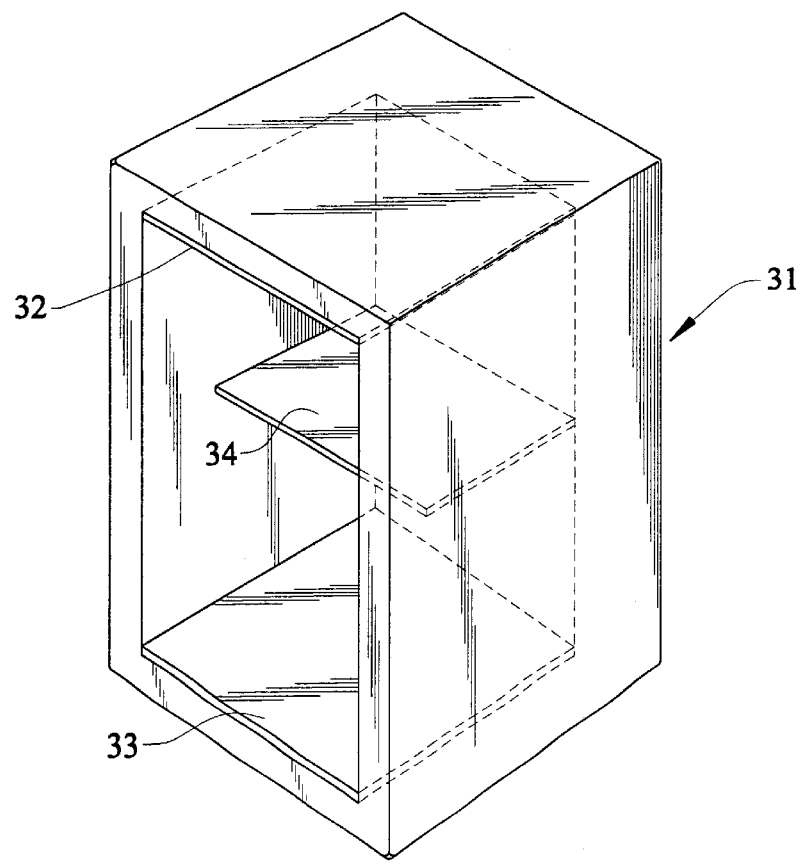
FIG. 3 shows a conventional refrigerator indicating alternative positions for the edge-lit panel.

In FIG. 3, a conventional refrigerator (31) is shown having three possible positions for the location of an edge-lit panel. The edge-lit panel may be located as a roof panel (32) and/or floor panel (33) in which positions a lighting assembly similar to that of FIG. 2 is preferably employed. The edge-lit panel may also be located as a shelf panel (34) in which position it is prefered that the edge-lit panel has a matrix of dots printed on both surfaces.

Figure 4:
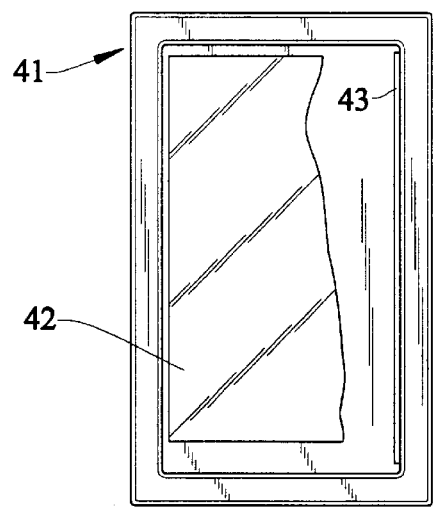
FIG. 4 shows a conventional refrigerator indicating additional alternative positions for the edge-lit panel.

In FIG. 4, a conventional refrigerator (41) is shown having two possible positions for the location of an edge-lit panel. The edge-lit panel may be located as a back panel (42) and/or side panel (43).

Figure 5:
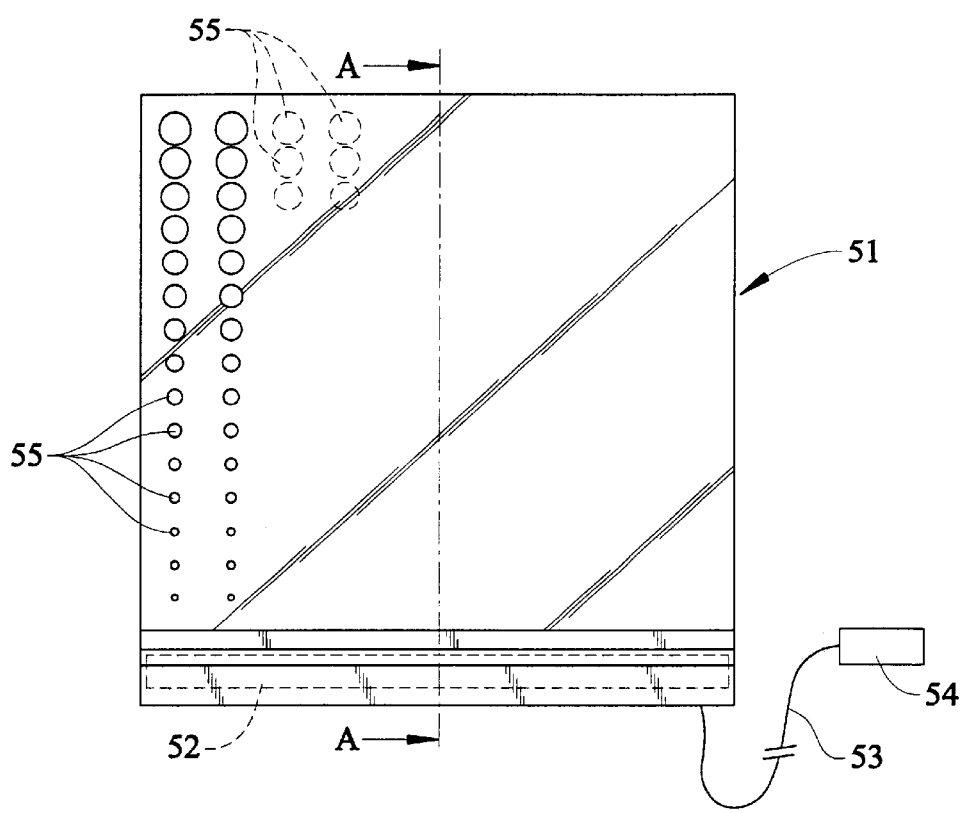
FIG. 5 shows the positioning of the light source along the edge of the edge-lit panel.

In FIG. 5, an edge-lit panel (51) is shown with a housing for a light source (52) positioned along an edge and which housing is electrically connected via a cable (53) to a power source and control mechanism (54). Edge-lit panel (51) has a matrix of dots (55) applied to both opposed surfaces. The fraction of the surface covered by dots (55) is increased with increasing distance from light source (52). The fraction of the surface covered by the dots is achieved by increasing the diameter of dots (55).

Figure 6:
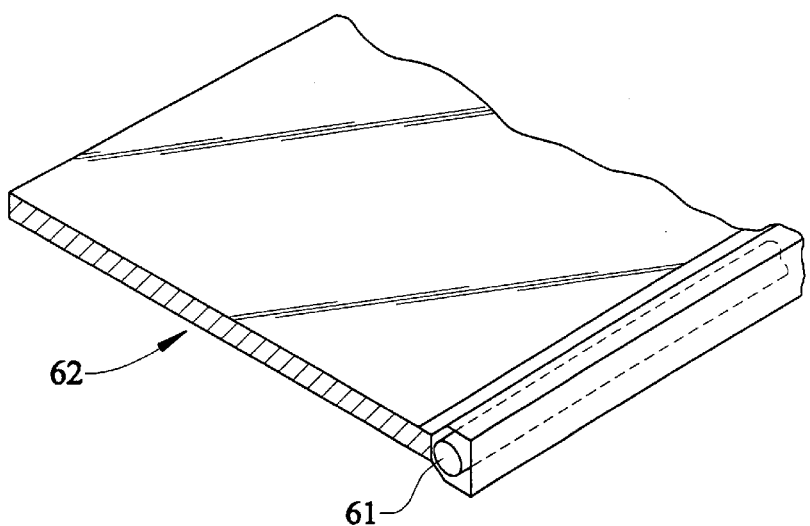
FIG. 6 shows a perspective view along section A—A of FIG. 5.

In FIG. 6, a view is shown along section A—A which shows that the light source (61) closely abutts the edge of the edge-lit panel (62).

Figure 7:
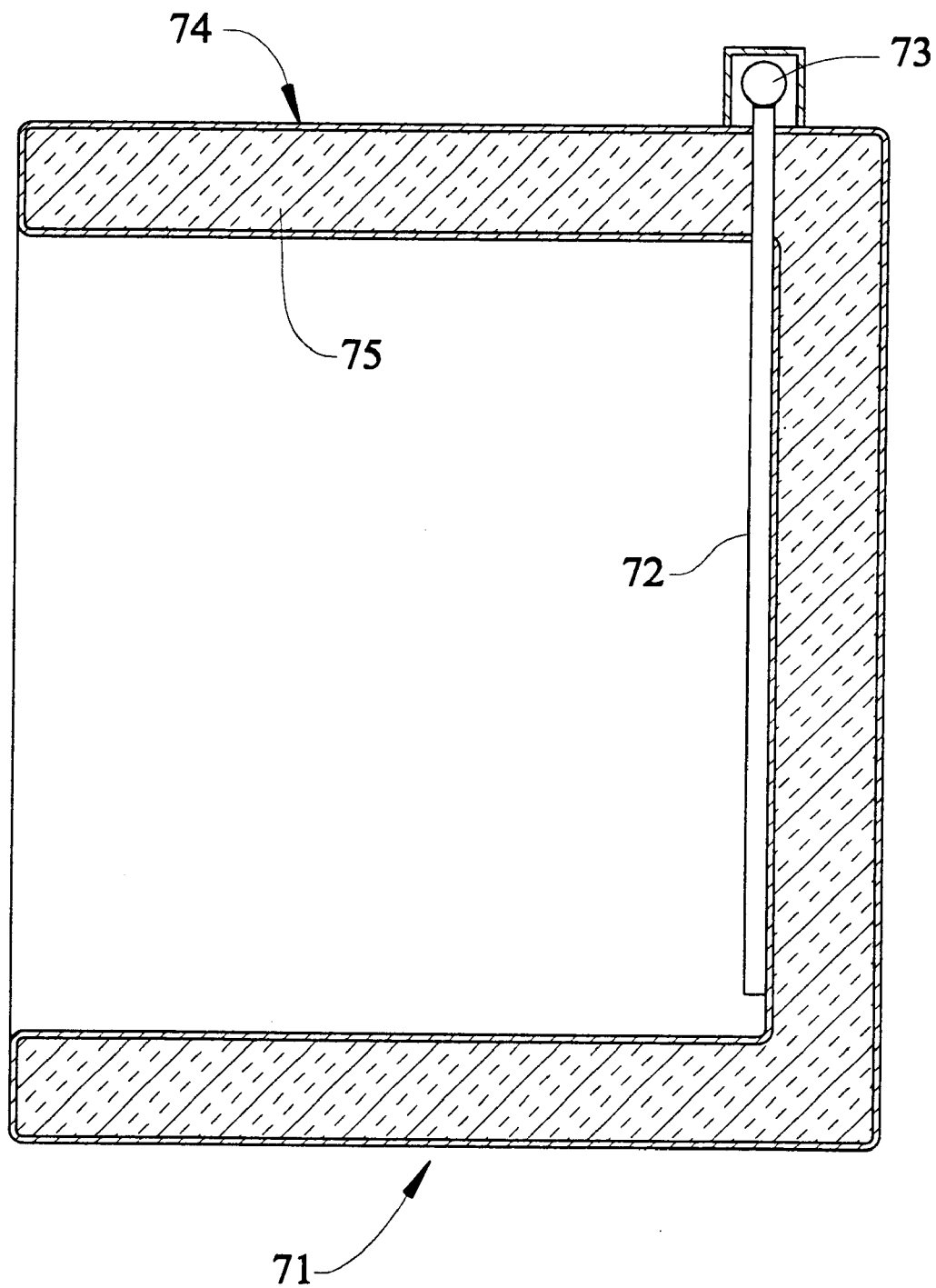
FIG. 7 shows a section through a conventional refrigerator indicating a possible position for the edge-lit panel and light source.

In FIG. 7, a conventional refrigerator (71) is sectioned to show a possible position of an edge-lit panel (72) and a light source (73). The light source (73) may be positioned on an external surface (74) of the refrigerator (71) and the edge-lit panel may penetrate from the external surface (74) through the foam insulation (75) of the refrigerator into the interior of the refrigerator.

Figure 8:
FIG. 8 is a comparative photograph of a conventional refrigerator which is illuminated using a conventional illumination system.

In FIG. 8, a conventional refrigerator is illuminated using a conventional incandescent bulb. As can be seen, the illumination effect is localised to immediately around the area of the bulb and the remainder of the interior of the refrigerator is relatively dark.

Figure 9:
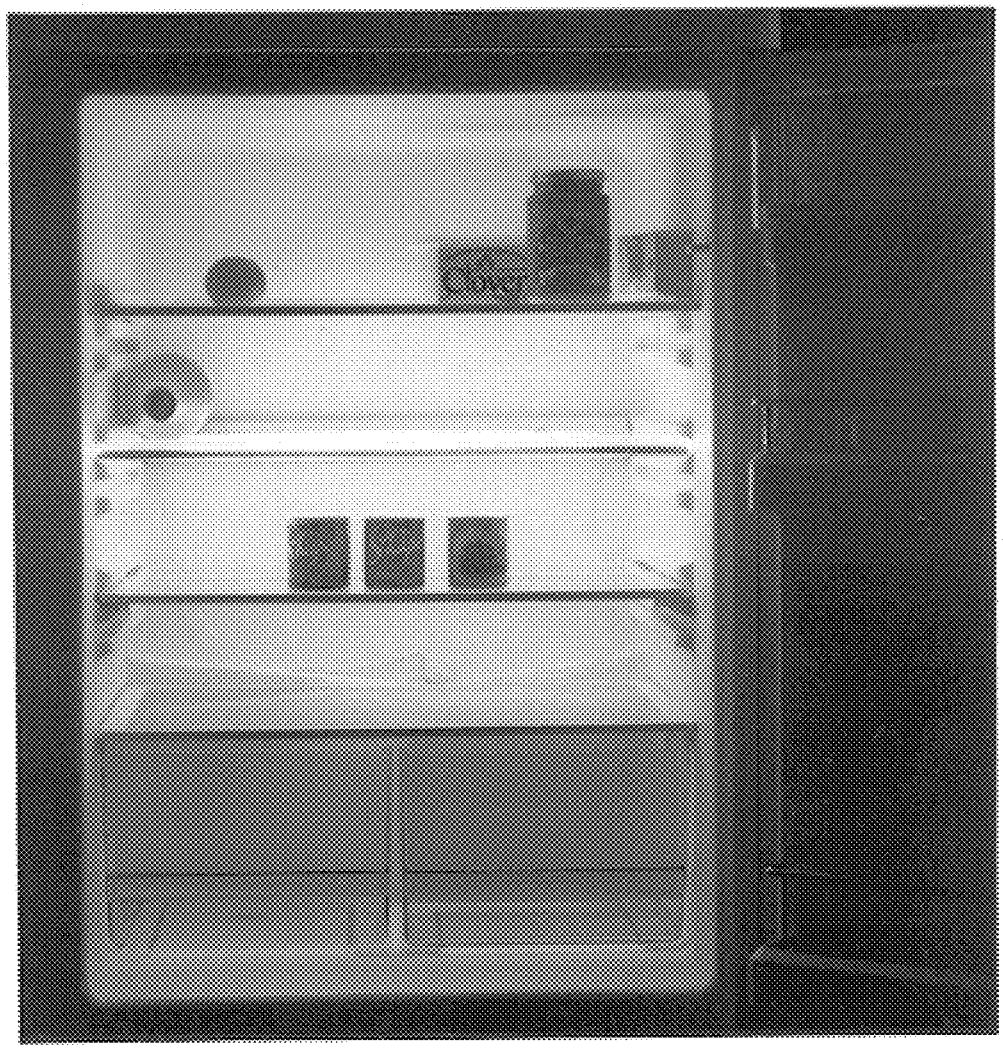
FIG. 9 is a photograph of a conventional refrigerator which is illuminated using an edge-lit panel positioned as a shelf.

In FIG. 9, a conventional refrigerator is illuminated using an edge-lit panel which is positioned as a shelf. The source of the illumination was the same intensity as that of the bulb used in the refrigerator of FIG. 8. As can be seen, the illumination effect is more evenly distributed throughout the refrigerator.

Figure 10:
FIG. 10 is a photograph of a conventional refrigerator which is illuminated using an edge-lit panel positioned as a back panel.

In FIG. 10, a conventional refrigerator is illuminated using an edge-lit panel which is positioned as a back panel. The source of the illumination was the same intensity as that of the bulb used in the refrigerator of FIG. 8. As can be seen, the illumination effect is more evenly distributed throughout the refrigerator, even when compared with the edge-lit panel used in FIG. 9.

What is claimed is:

1. A refrigerator capable of being internally illuminated wherein the illumination is provided by an edge lit panel of a substantially transparent material having two opposed surfaces of which at least one is within the refrigerator and on which a matrix of dots is applied so as to produce a light piping effect internally in to the refrigerator and wherein the light source of the edge-lit panel is located within the refrigerated space of the refrigerator.

2. A refrigerator as claimed in claim 1 wherein the edge-lit panel is a side panel of the refrigerator.

3. A refrigerator as claimed in claim 2 wherein the edge-lit panel is part of a lighting assembly which includes both a light diffuser which is applied to the surface that carries the matrix of dots and also a reflective layer which is applied to the surface which opposes the surface that carries the matrix of dots.

4. A refrigerator as claimed in claim 1 wherein the edge-lit panel is a shelf.

5. A refrigerator as claimed in claim 4 wherein the edge-lit panel has a matrix of dots applied to both opposed surfaces.

6. A refrigerator as claimed in claim 1 wherein the edge-lit panel is formed from acrylic sheet.

7. A refrigerator as claimed in claim 6 wherein the acrylic sheet includes an optical brightener.

8. A refrigerator as claimed in claim 1 wherein on the surface of the edge-lit panel that carries the matrix of dots the fraction of the surface covered by the dots is increased with increasing distance from the light source.

9. A refrigerator as claimed in claim 8 wherein the increase in the fraction of the surface covered by the dots is achieved by increasing the diameter of the dots.

* * * * *